(12) United States Patent
Hruby

(10) Patent No.: US 6,546,305 B1
(45) Date of Patent: Apr. 8, 2003

(54) METHOD AND APPARATUS FOR JEWELRY DESIGN

(75) Inventor: Megumi Hruby, Brooklyn, NY (US)

(73) Assignee: Harry Winston Inc., New York, NY (US)

( * ) Notice: Subject to any disclaimer, the term of this patent is extended or adjusted under 35 U.S.C. 154(b) by 0 days.

(21) Appl. No.: 09/533,151

(22) Filed: Mar. 23, 2000

(51) Int. Cl.⁷ .............................................. G06F 19/00
(52) U.S. Cl. ........................ 700/117; 700/83; 703/6
(58) Field of Search ........................ 700/117, 118, 700/119, 120, 182, 17, 83, 233; 345/764; 703/6; 705/26, 27

(56) References Cited

U.S. PATENT DOCUMENTS

| | | | |
|---|---|---|---|
| 5,116,174 A | * 5/1992 | Fried et al. | 269/21 |
| 5,121,329 A | * 6/1992 | Crump | 228/180.5 |
| 6,003,228 A | * 12/1999 | Riggio | 43/54.1 |
| 6,083,267 A | * 7/2000 | Motomiya et al. | 345/764 |
| 6,164,815 A | * 12/2000 | Degonda | 368/278 |
| 6,229,564 B1 | * 5/2001 | High | 348/94 |

* cited by examiner

*Primary Examiner*—Leo Picard
*Assistant Examiner*—Kidest Bahta
(74) *Attorney, Agent, or Firm*—Blaney Harper; Jones Day

(57) ABSTRACT

The present invention utilizes a computer program to size and orient one or more feature items on a jewelry design having a feature path. Typically feature paths are necklines, wristbands, broaches or rings. A feature item is a gemstone, set of gemstones or metal designs such as a cross, circle or other artful shape. The program and computer system of the present invention selects a feature path, detects a starting location on the feature path and then orients a first feature item in three dimensions on this feature path with respect to a three dimensional surface representing the jewelry wearer. Orienting the feature item in three dimensions is critical so that the feature item is properly displayed on the jewelry when the jewelry is worn. Once the initial feature item has been oriented, subsequent feature items are automatically placed on the feature path, sized with respect to the initial feature item and oriented with respect to both the initial feature item and the three dimensional surface. This automatic sizing and orientation of subsequent feature items quickly creates a complete jewelry design.

11 Claims, 11 Drawing Sheets

METHOD AND APPARATUS FOR JEWELRY DESIGN

FIELD OF THE INVENTION

The present invention relates to the field of jewelry design. More particularly, this invention relates to a computer system and program for creating jewelry designs.

BACKGROUND OF THE INVENTION

Jewelry design normally involves the creation of individualized jewelry items. For example, a diamond necklace may be designed to have a wide variety of numbers of diamonds, diamond shapes, diamond quality, diamond placements or orientations, chain lengths, chain designs or color. An appropriate selection of these or other characteristics can result in a necklace which is highly attractive to certain individual customers and for which those customers may pay a premium to express themselves through the jewelry design. Generally, to create such a design, a highly skilled artisan assimilates information concerning the design, including specific information from one or more potential purchasers. The designer then creates a feature design and lays that feature design out on a neckline (or other feature path) a number of times, each time re-sizing and re-orienting the feature to reflect the feature placement on the feature path. The difficulty with this process is that re-sizing and re-orienting a single or multiple feature item a number of times is a time consuming and inefficient process. Such a conventional process does not provide the designer with the freedom to quickly create multiple designs.

Furthermore, because the conventional design process does not enable a designer to quickly create multiple designs, design changes suggested by individual customers or other persons (e.g., sales personnel) having information to be used in the design are generally not directly incorporated into the design process. This is a problem because the more involved a customer is in the creation of the design, the more attached the customer may become to the resulting item of jewelry. Similarly, the more involved sales personnel are in creating a design, the more customer information is incorporated into the design and the more the sales person will be involved in selling that specific design.

OBJECTS OF THE INVENTION

It is an object of the present invention to provide a method and apparatus to create a jewelry design.

It is another object of the present invention to provide a method and apparatus that automatically places feature items along a jewelry feature path.

It is still another object of the present invention to provide a method and apparatus that automatically places feature items along a jewelry feature path in three dimensions.

It is still a further object of the present invention to provide a method and apparatus that automatically arranges and orients feature items at a defined angle with respect to a tangent to a jewelry feature path.

It is still another object of the present invention to provide a method and apparatus that enables a potential customer to participate in the jewelry design.

It is still a further object of the present invention to provide a method and apparatus having an interface that automatically arranges and orients feature items along a jewelry feature path according to characteristics specified by a potential customer.

SUMMARY OF THE INVENTION

The present invention utilizes a computer program to size and orient one or more feature items on a jewelry design having a feature path. Typically feature paths are necklines, wristbands, broaches or rings. A feature item is a gemstone, set of gemstones or metal designs such as a cross, circle or other artful shape. The program and computer system of the present invention selects a feature path, detects a starting location on the feature path and then orients a first feature item in three dimensions on this feature path with respect to a three dimensional surface representing the jewelry wearer. Orienting the feature item in three dimensions is critical so that the feature item is properly displayed on the jewelry when the jewelry is worn. Once the initial feature item has been oriented, subsequent feature items are automatically placed on the feature path, sized with respect to the initial feature item and oriented with respect to both the initial feature item and the three dimensional surface. This automatic sizing and orientation of subsequent feature items quickly creates a complete jewelry design.

DETAILED DESCRIPTION OF THE INVENTION

Figure 1:
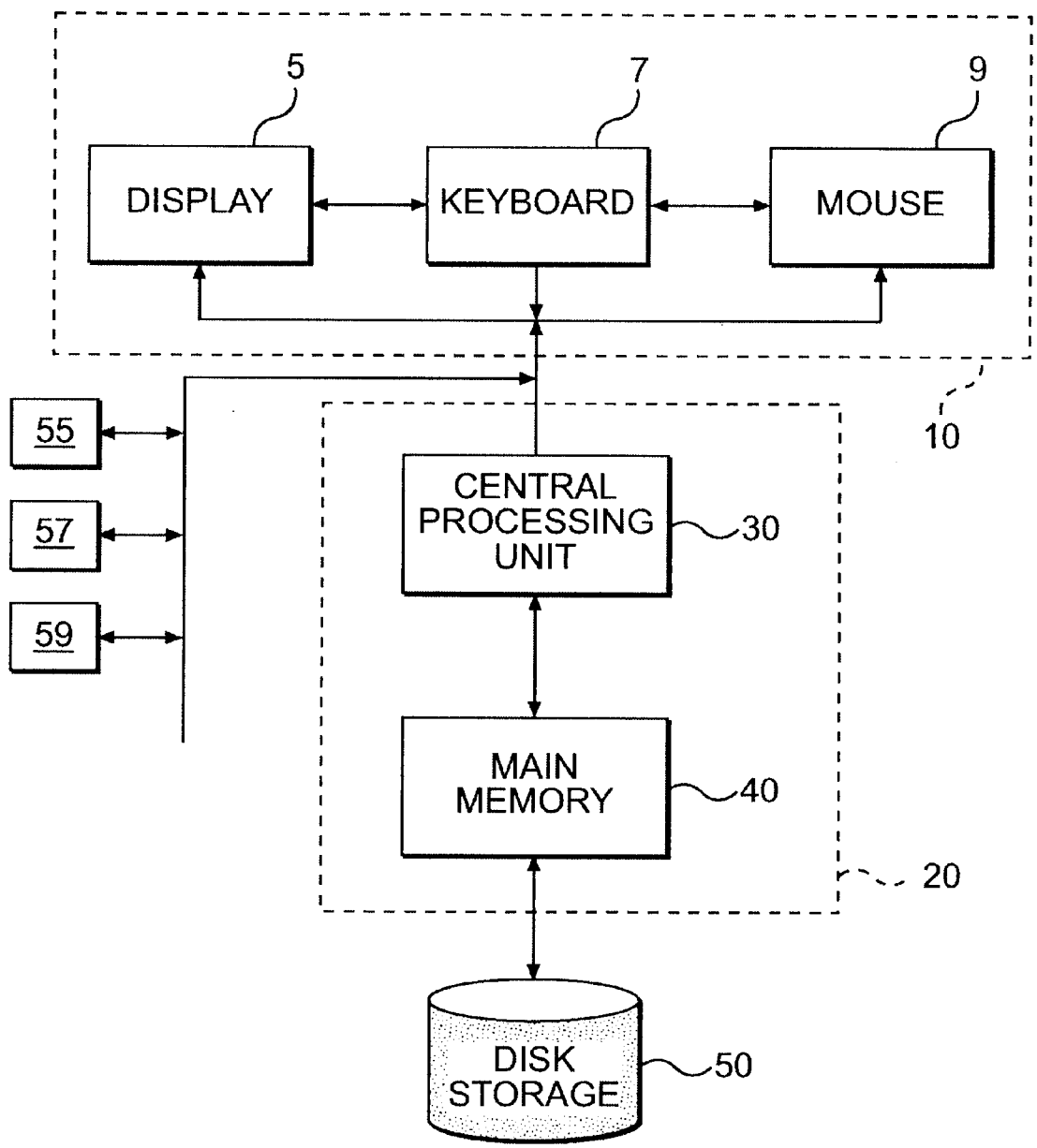
FIG. 1 illustrates a computer system for designing jewelry according to one embodiment of the present invention.

FIG. 1 is a block diagram of a computer system used for retrieving information from a database. Computer 20 comprises a central processing unit (CPU) 30 and main memory 40. Computer 20 is connected to an Input/Output (I/O) system 10 and disk storage unit 50. The I/O system 10 includes a display 5, a keyboard 7 and a mouse 9. Furthermore, this computer system is connected to a variety of networks for communicating with other computers and obtaining access to remote databases. Among the networks connected to this computer system is the worldwide web 55, an intranet 57, private external network 59. In general, the disk storage unit 50 stores the program for operating the computer system and it stores the documents of the database. The computer 20 interacts with the I/O system 10 and the disk storage unit 50. The computer 20 executes operations according to instructions contained in a program that is retrieved from the disk storage unit 50. A user interacts with the program to cause the computer 20 to create a jewelry design, or parts thereof, which is then stored in a database located either in disk storage 50 or in a storage location accessible over a network. Instructions to the computer also cause information to be received over a network or to be distributed to specific individuals over a network. In this way, information used in creating jewelry designs can be accessed or displayed remotely.

Figure 2:
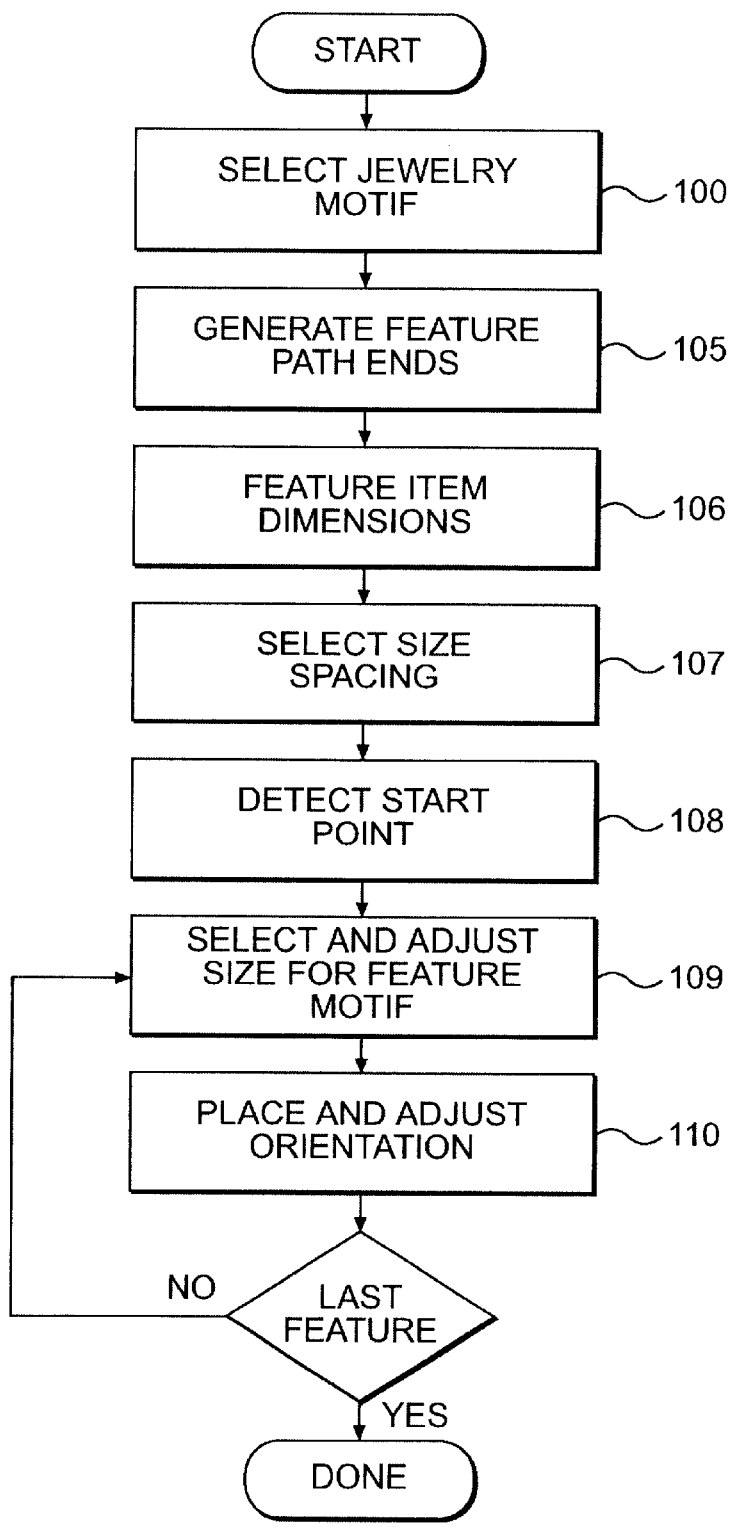
FIG. 2 illustrates a flow chart of a program for designing jewelry according to one embodiment of the present invention.
Figure 3A:
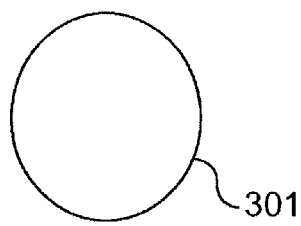
FIGS. 3a–f illustrates a series of feature path motifs according to one embodiment of the present invention.
Figure 3B:
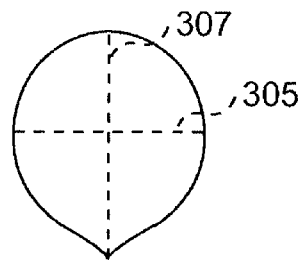
Figure 3C:
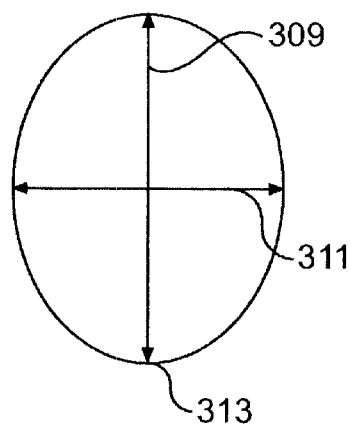
Figure 3D:
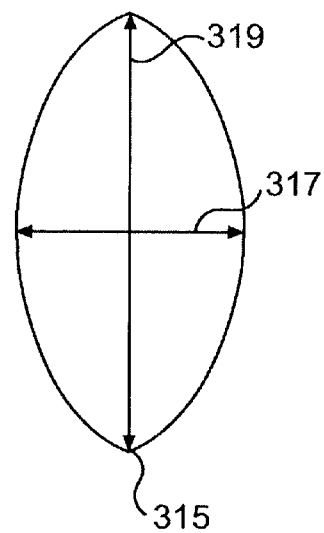
Figure 3E:
Figure 3F:
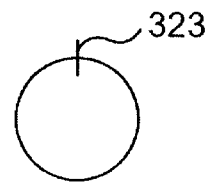

FIG. 2 is a flowchart of a program which operates on a computer system, such as that shown in FIG. 1, and which creates a jewelry design. In particular, a program according to the flowchart of FIG. 2 creates a jewelry design and automatically sets feature items (e.g., gemstones or metal designs) along a feature path. The first step, as illustrated in FIG. 2, is to select a jewelry motif 105 (e.g., the shape of a necklace, broach, bracelet, ring, etc.). In this step, a user selects a motif from a pre-designed set of motifs. The set of motifs is stored in memory 40 or on disk 50 and is displayed to the user on display 5. FIG. 3 illustrates a series of potential motifs that may be displayed to a user. Those of skill of the art are familiar with how to define an essentially limitless number of pre-set motifs and FIG. 3 merely illustrates some of these motifs. Each of these motifs has associated therewith a feature path along which feature motifs may be placed. For example, FIGS. 3(*a*) and 4(*a*) illustrate a conventional neckline motif having a feature path in the shape of a circle. This path includes a designated starting point 301 which corresponds to the intended front/center location of the necklace. FIG. 3(*b*) and FIG. 4(*b*) illustrate a neckline motif having a feature path formed in a tear drop shape. This path has a major axis 307, minor axis 305 and front/center location 303. Also, FIG. 3(*c*) illustrates a necklace motif having a feature path formed in an oval shape. This path has major axis 309, minor axis 311 and front/center location 313. FIG. 3(*d*) illustrates a necklace motif having a feature path formed in a modified oval shape. This path has major axis 319, minor axis 317 and front/center point 315. FIG. 3(*e*) illustrates a bracelet motif. While this motif has no front/center location, a start point 321 on the path is illustrated. FIG. 3(*f*) illustrates a ring motif which (as described in the bracelet) has no front/center but incorporates a top/center location 323 along its feature path which runs along the perimeter of the ring.

Figure 4A:
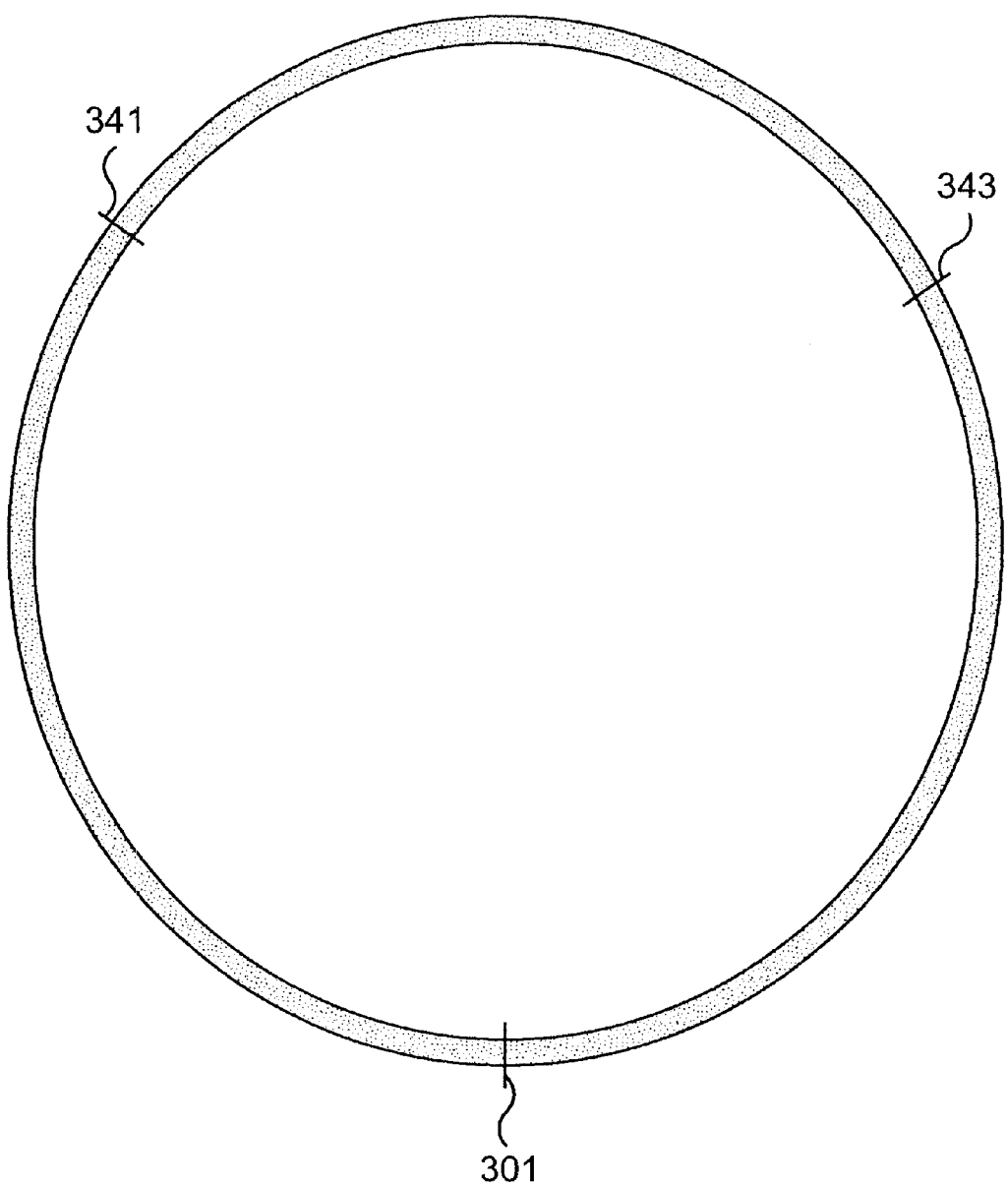
FIGS. 4a–b illustrates a feature path motifs having defined feature path endpoints.
Figure 4B:
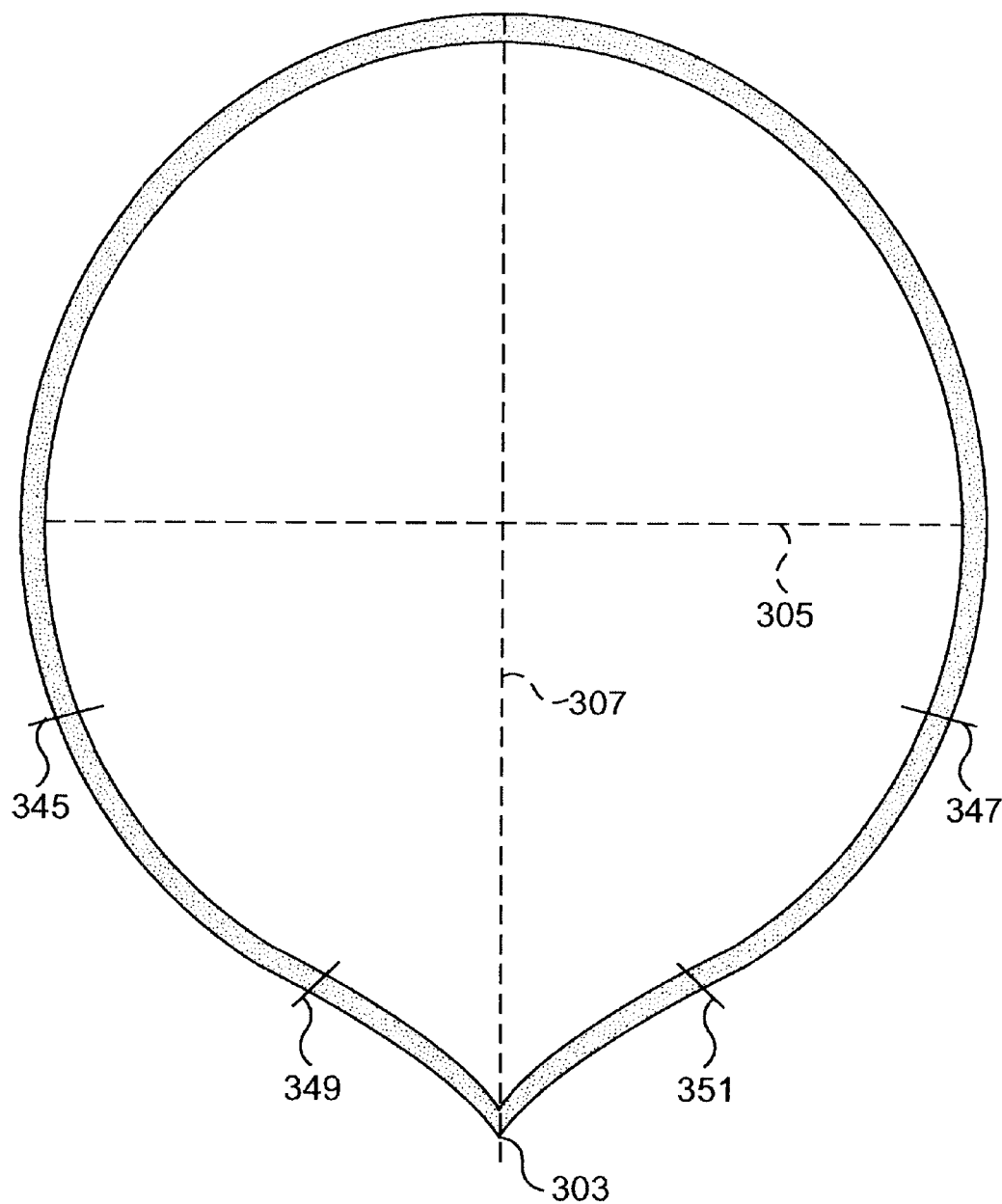
Figure 5A:
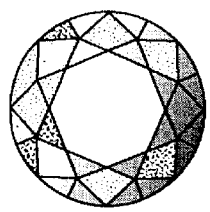
FIGS. 5A–D illustrates a series of diamond cuts as presented to a user according to one embodiment of the present invention.
Figure 5B:
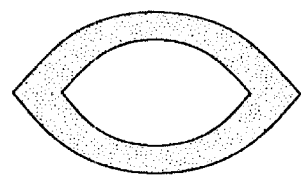
Figure 5C:
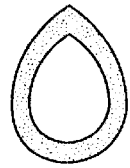
Figure 5D:
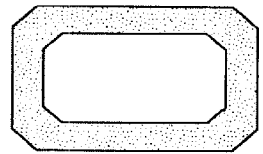

Once a jewelry motif has been selected as illustrated by step 100 of FIG. 2, the user selects the feature path endpoints in step 105. In this step, the potential locations for feature items are defined. For example, as illustrated in FIG. 4(*a*), two feature path ends define the length of the feature path along which feature items will be placed (i.e., feature items may be placed all along the feature path between points 341 and 343 which includes the front center point 301). The endpoints 341 and 343 can be made arbitrarily close to each other so that the feature path is essentially the entire motif or so that the feature path only has one feature location (e.g., front/center point 301). Alternatively, as shown in FIG. 4(*b*), there may be more than one pair of endpoints. Specifically, the multiple feature paths may be defined on one motif between, for example, endpoints 345 and 349 and between 347 and 351. The feature path ends may also be defined by specifying the percentage of the motif to be included in the feature path. This percentage may be defined using the front center point as the middle of the feature path.

Once the feature path has been defined, the feature item dimensions must be defined as illustrated by step 106 in FIG. 2. In this step, as in step 100, the user selects one or more types of feature items from, for example, a menu of items. For example, a user may first be presented with a list of available feature types such as diamonds, emeralds, pearls or metal (e.g., silver, gold, platinum, titanium or alloys) design. When a user, for example, selects "diamonds" from this list, a series of available diamond cuts, such as shown in FIG. 5, are presented to the user. FIG. 5(*a*) illustrates a brilliant cut, 5(*b*) illustrates a marquis shape cut, 5(*c*) illustrates a pear shape and 5(*d*) illustrates a emerald (or radiant) cut. Other types of shapes could include a princess cut, baguette cut or square cut. Similarly, a set of gemstone cuts would be displayed for the emeralds selection. Also, a variety of shapes and/or quality of pearls would be displayed for the "pearl" selection and/or a selection of gold feature designs (e.g., cross, circle, swirl, wings, etc.) would be displayed for the "gold" selection.

Figure 6A:
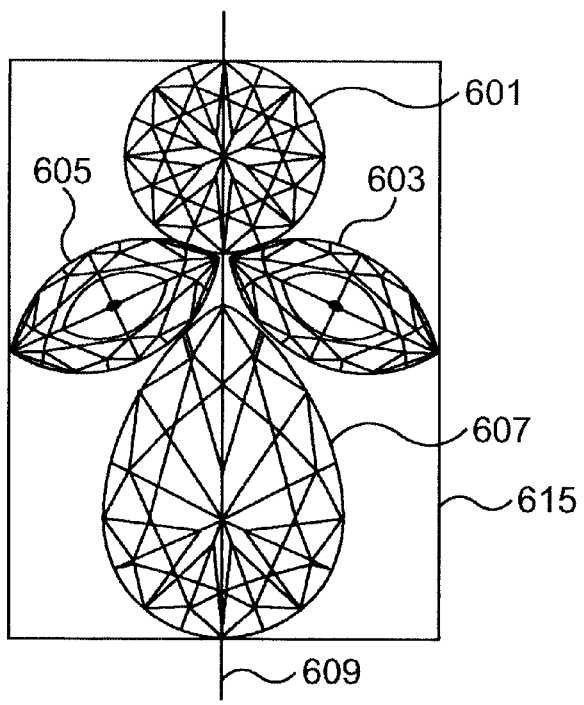
FIGS. 6a–b illustrates a complex feature item according to one embodiment of the present invention.
Figure 6B:
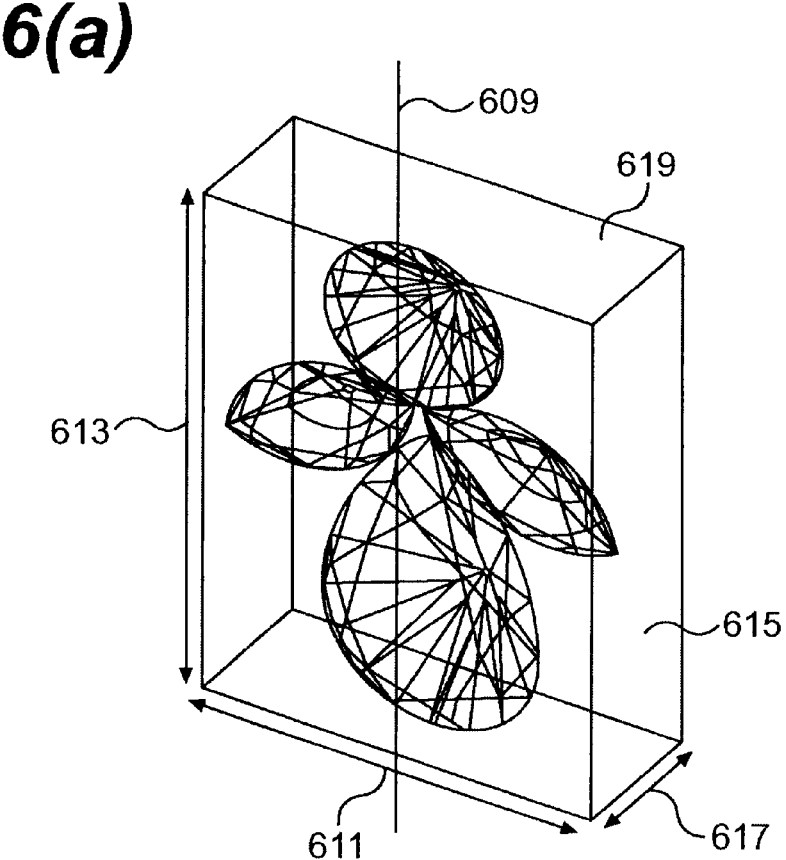

Once a first type of feature item (e.g., pear shape diamond) is selected, the program places this feature item in a three dimensional design space to create a feature item motif. For example, the selected feature item may be placed in the design space using a conventional "drag and drop" graphical user interface ("GUI") of a computer system in which the user selects a specific feature item with a cursor and then drags that item to the three dimensional design workspace window within the GUI. The user can then enlarge or reduce the feature item as desired with conventional scale control techniques. Also, multiple feature items may be added to the workspace to create a single complex feature item (i.e., feature motif). That is, a user may select multiple feature items and place them on the design pallette with respect to a reference and create a complex feature item. For example, FIG. 6 illustrates a complex diamond feature item consisting of a brilliant cut 601, two marquis cuts 603 and 605 and a pear cut 607 placed in the design space with respect to central axis 609. Additionally, the feature items need not be of the same type to be included in a complex feature item. For example, a gold or pearl feature item may be included with a diamond feature item to create a complex feature. Moreover, multiple feature motifs may be created by the user. Where multiple feature motifs are created, each feature motif is associated with a priority tag (e.g., A, B, etc.) which identifies the priority of use for placement on the feature path.

Once the feature item has been created, the program determines the dimensions and lateral orientation of the feature item as shown in step 106 of FIG. 2. Specifically, the orientation of the feature item is determined with respect to a reference. As illustrated in FIGS. 6(*a*) and (*b*), the reference is a central axis 609. As shown in FIG. 6(*a*), the feature item is symetrically designed about the central axis. The feature item could also be non-symetrical about the central axis. Once the lateral orientation of the feature item with respect to a reference is defined, the height 613 and width 611 and depth 617 of the item (as illustrated in FIG. 6(*b*)) are determined. Once the height, width and depth are determined, a feature block 615 is created which is an outline formed by the height, width and depth of the feature item oriented with respect to the reference. The feature block 615 has top side 619.

As illustrated in step 107 of FIG. 2, once the dimensions and lateral orientations have been defined, the size and spacing of multiple feature motifs is determined. Specifically, according to steps 109 and 110 described below, the program automatically adjusts the size and orientation of the feature items within a range specified by the user as those feature items are placed on the feature path. The user specifies in step 107, through a dialog box in the GUI or otherwise, a range over which the feature size is intended to vary wherein the feature item placed at the starting point defines full size and the size of the feature motifs placed at the feature path endpoints are adjusted to be a percentage (e.g., 25%) of the full size. The sizes of the feature motifs between the starting and endpoints of the feature path are adjusted (when placed on the feature path) to an intermediate percentage depending on the location of the feature motif (e.g., motifs closer to the starting point will be more near full size than motifs located closer to the endpoints). In this manner, the size of the feature motif is automatically adjusted in a uniform manner within the range set by the user along the feature path. The first feature motif is, of course, sized at 100%. Moreover, in step 107, the user selects a spacing between adjacent feature motifs. As described above, the spacing selection is a range varying over the feature path length.

As illustrated in FIG. 2, once the spacings and feature sizes have been defined in step 107, the program 108 detects a starting point on the feature path for placing the feature motifs. This starting point will vary depending on the jewelry motif. For example, the starting point for a necklace motif may be defined as the front/center point 301. For rings, the starting point may be the top center and for bracelets it may be at one end. The starting point could also be adjusted through a dialog box in the GUI to be any defined point on the feature path.

Figure 7:
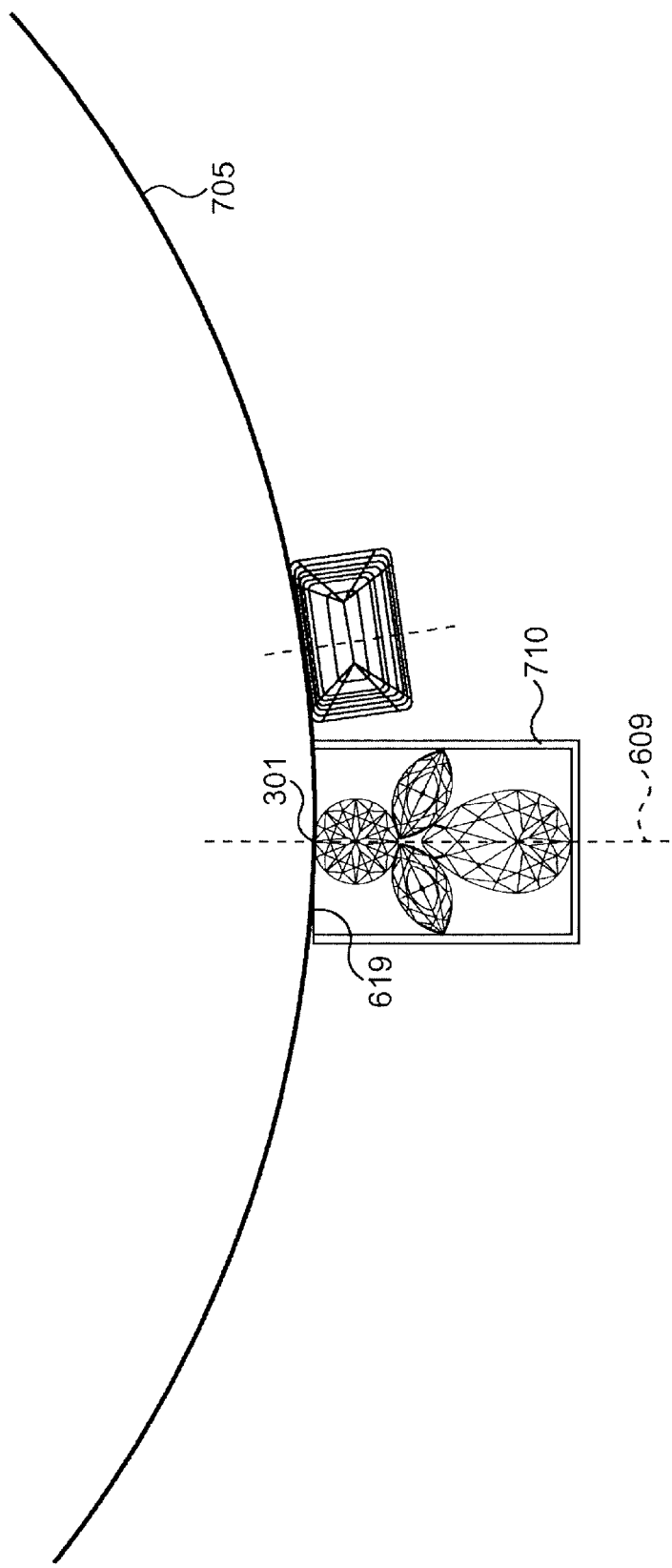
FIG. 7 illustrates the placement of a feature item on a feature path according to one embodiment of the present invention.
Figure 8:
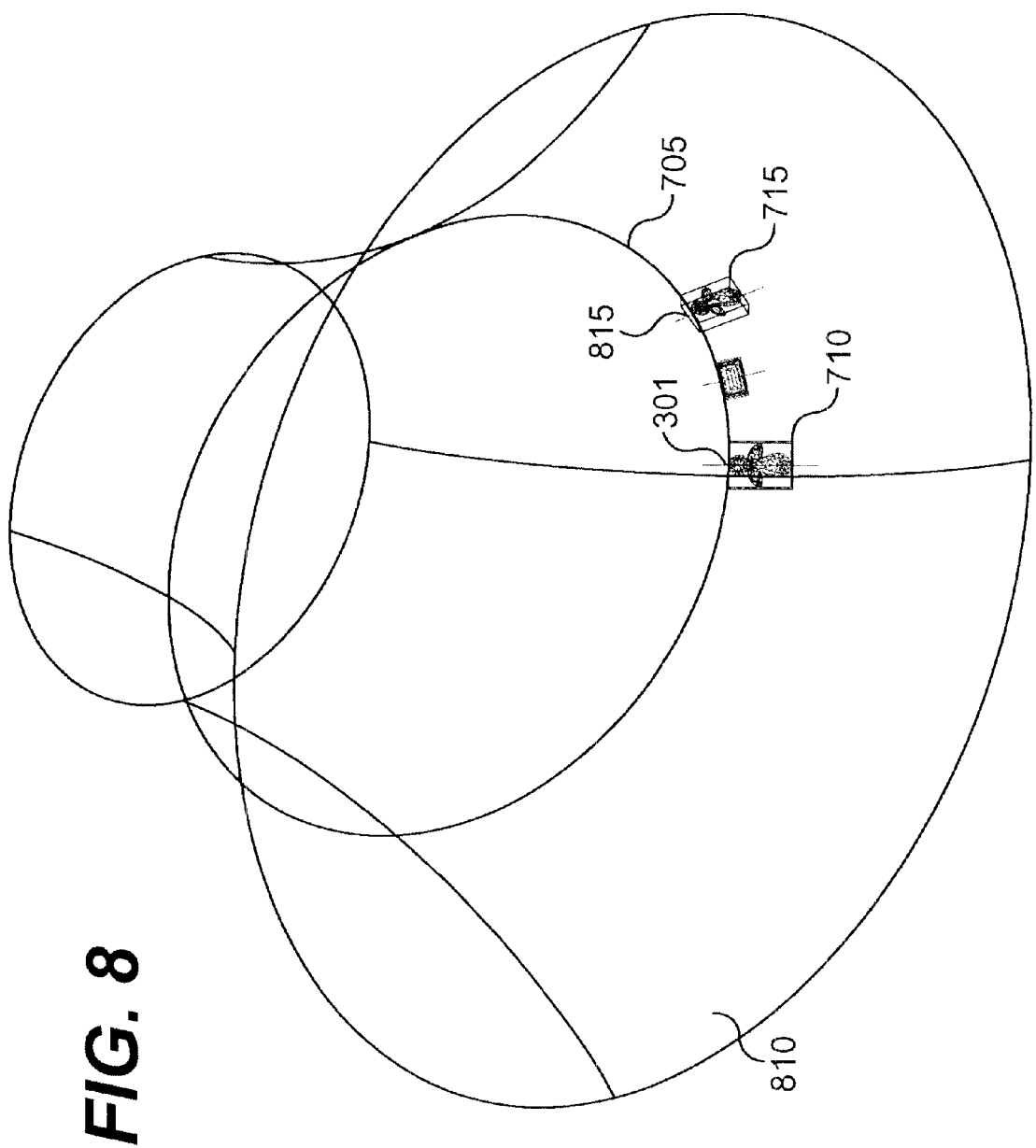
FIG. 8 illustrates the orientation of a feature item on a feature path with respect to a three dimension surface according to one embodiment of the present invention.

After the starting point has been detected, the feature motif is selected (e.g., highest priority for first motif) and its size is determined (e.g., 100% for the first motif) 109 and the program places 110 the feature motifs, one at a time, along the feature path. As shown in FIG. 7, the highest priority feature motif 710 is placed and oriented at the starting point such that a defined characteristic of the feature motif (e.g., the top side 619 of the feature block) has a defined relationship (e.g., placed on or offset from) to a tangent to the feature path 705 at the starting point 301. In FIG. 7, the central axis 609 of the feature block intersects the starting point at the tangent and the top side lies along the tangent. The step 110 of FIG. 2 also orients the feature motif 710 in three dimensions with respect to a three dimensional surface. In particular, as illustrated in FIG. 8, the feature path 710 is constructed around a three dimensional surface 810. This three dimensional surface could simulate a neckline, wrist, finger or other object on which the jewelry motif would normally lie. The feature motif 710 is then oriented to lie, for example, flat on the surface 810. The feature motif 710 could, of course, be oriented to lie on any orientation with respect to the surface 810. In this way, the feature motif is oriented with respect to both the feature path and the object surface on which the jewelry is intended to be worn.

Once the initial feature motif 710 has been placed on the feature path 705 and oriented in three dimensions, additional feature motifs are automatically placed at feature points spaced apart along the path 705. Specifically, the program (as illustrated in FIG. 2) returns to step 109, selects the next feature motif and adjusts its size. If, for example, only one feature motif is being used, that motif would be copied in the GUI and simply reduced in size. That motif is then placed 110 on the feature path according to the selected spacing. The spacing between feature motifs may be adjusted through a dialog box in the GUI and is typically one half of the feature motif width. Because the size of the feature motifs typically vary along the feature path, the points at which the feature motifs intersect the feature path must vary as well to maintain the spacing between feature motifs. Furthermore, a jewelry design may have multiple features. In this case, the designer would select different feature motifs and associate them with points on the feature path through, for example a drag and drop interface. Because the feature motifs will have different widths which will vary along the feature path, the intersection point of the feature motif with the path must be adjusted. Specifically, the interval between feature points is defined as $((W_A+W_B)/2+W_{user})$ wherein $W_A$ and $W_B$ refer to the width of adjacent feature motifs A and B respectfully and $W_{user}$ refers to the user defined spacing parameter discussed above.

As illustrated in FIG. 8, feature motif 715 is placed at point 815 on the feature path 705. The spacing between points 815 and 301 is described above. The orientation of motif 715 is adjusted to lie flat on surface 810. Motif 715 may be rotated such that the reference line 717 has a specific (e.g., parallel) relationship to reference line 609 or has a specific relationship (i.e., perpendicular) to a tangent to the feature path 705. The rotational relationship between reference lines of adjacent feature motifs may be individually adjusted.

Figure 9:
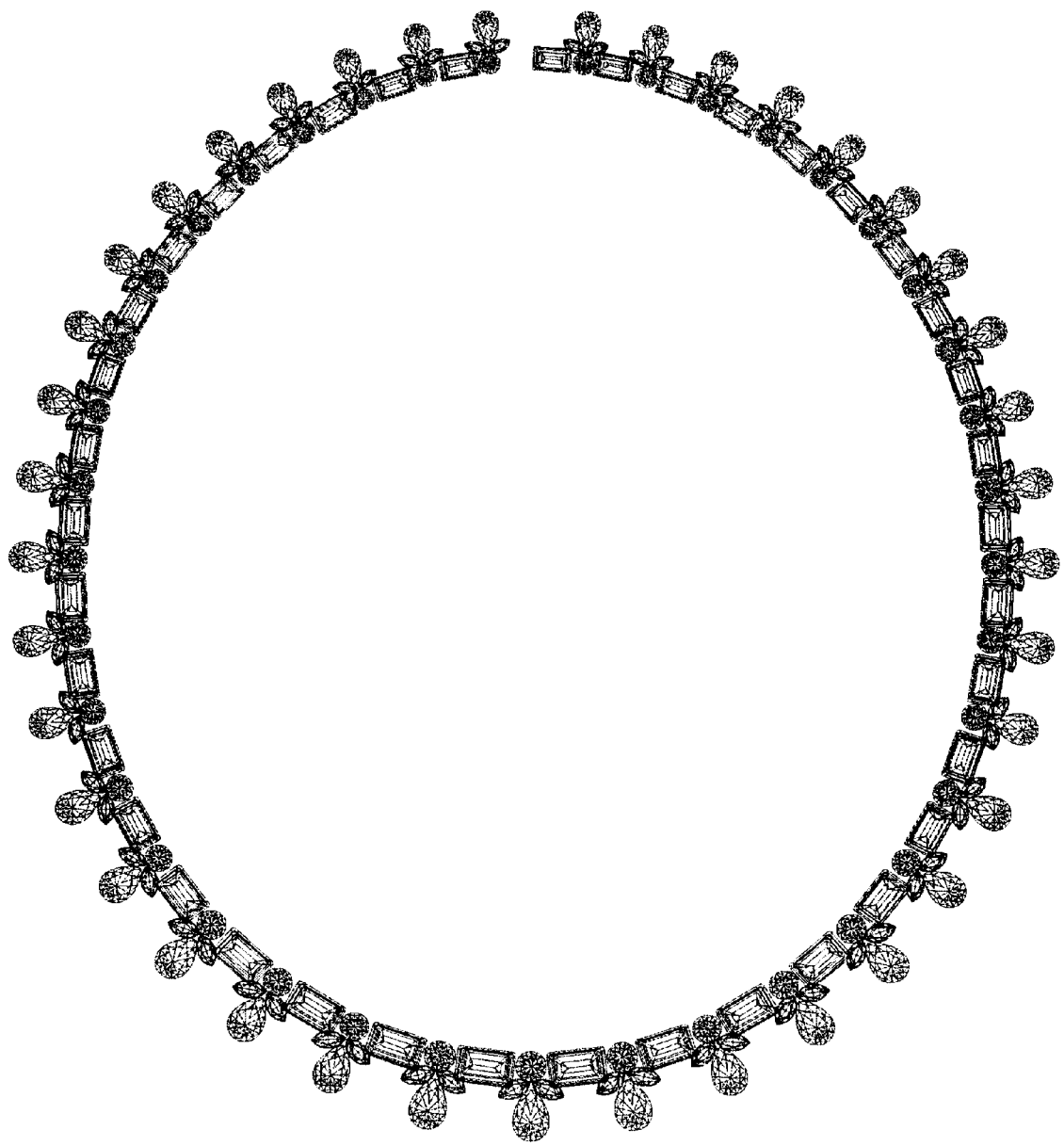
FIG. 9 illustrates a complete jewelry design according to one embodiment of the present invention.

As further illustrated in FIG. 2, steps 109 and 110 are repeated (i.e., select feature motif, size, place and adjust orientation) until all the feature motifs are placed on the feature path. Program instructions for carrying out the steps illustrated in FIG. 2 are set forth in Appendix A attached hereto and fully incorporated herein. Once all the items have placed, the user may select any particular item(s) and adjust spacing, orientation or other parameters individually. Once this manual adjustment is complete, the jewelry design is complete. An example of a completed design according to one embodiment of the present invention is shown in FIG. 9. The completed design is then saved in mass storage 50 of the computer system 20 as illustrated in FIG. 1.

Figure 10:
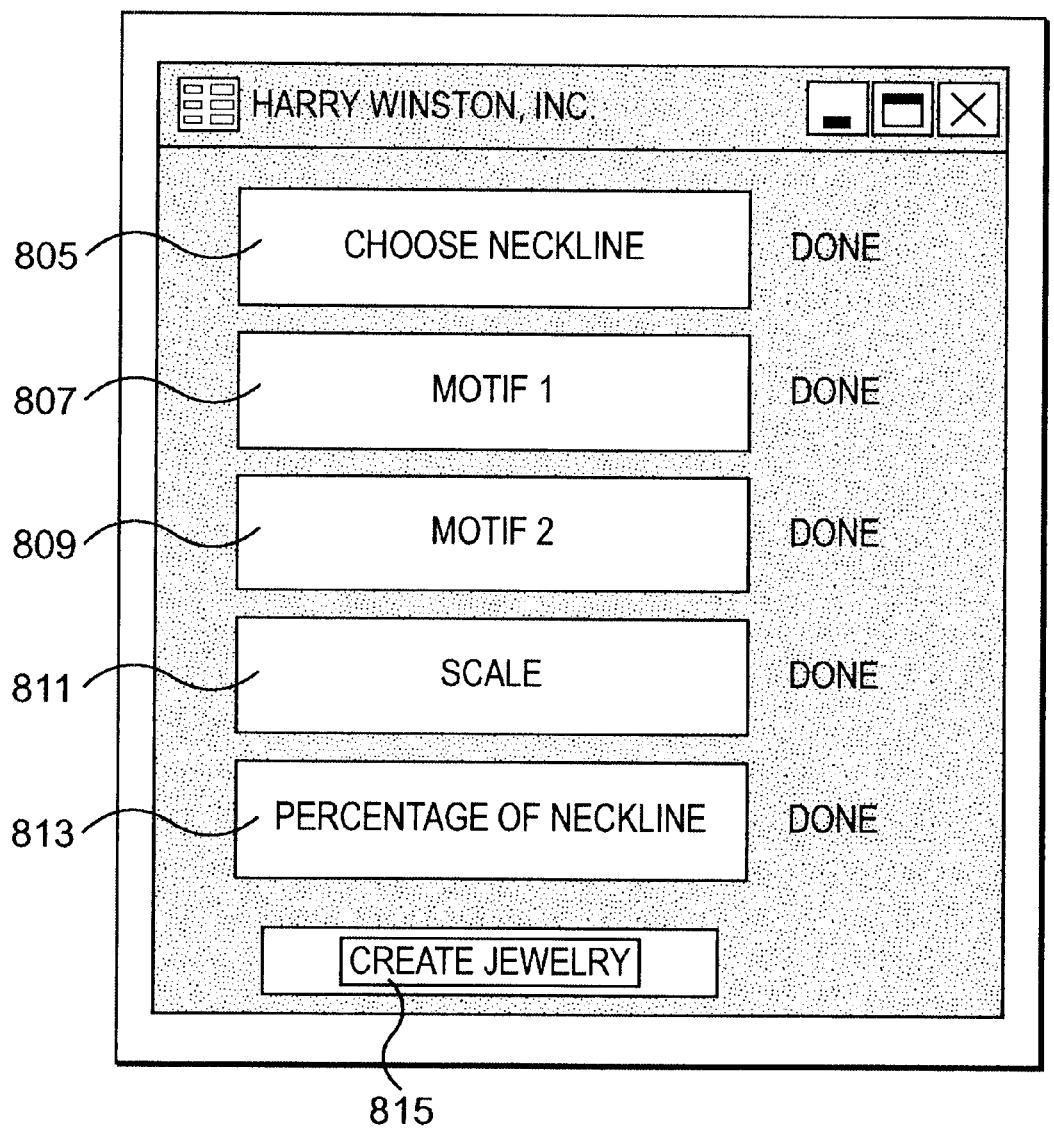
FIG. 10 illustrates a user interface screen according to one embodiment of the present invention.

Once the design has been saved, it can be retrieved and modified as part of a library of designs that can be individually tailored to specific customer desires. Moreover, because the programs for creating the designs and the resulting library of designs are part of a computer system which can transmit instructions and resulting designs to users connected to the computer system, the programs and libraries can form an integral part of the business of creating and selling jewelry. For example, FIG. 10 illustrates a user interface screen that may be used by customers or salespeople in a specific sales outlet. As illustrated in FIG. 10, a user would create a jewelry design by i) selecting 805 a machine (jewelry motif) from a library, ii) selecting 807 and 809 one or more feature motifs, iii) selecting 811 the reduction scale for feature motifs, iv) selecting 813 the percentage of neckline to be used for feature motif placement and then v) running the program by selecting 815 the "Create Jewelry" button. The computer system then immediately returns the completed design to the user. As a result, the user becomes more of a part of the design process, and hence, more willing to purchase the designs which the user helped create. Furthermore, the design process can be accessed over the internal and external networks attached to the computer systems. As a result, designs can be quickly and conveniently transmitted to different locations worldwide. Transmittal of designs in this way permits remote locations timely access to the latest designs and design processes without investment in substantial computer resources at the remote location.

While this invention has been particularly described and illustrated with reference to a preferred embodiment, it will be understood by one of skill in the art that changes in the above description or illustrations may be made with respect to form or detail without departing from the spirit and scope of the invention.

I claim:

1. A computer assisted method for creating a jewelry design, comprising:
   selecting a jewelry motif having a feature path and a plurality of locations along said feature path for placing feature motifs;
   selecting at least one feature motif wherein each of said selected feature motifs has an assigned priority;
   placing a first selected feature motif on said feature path at a first selected location;
   orienting said first selected feature motif with respect to a tangent to said feature path at said first selected location;
   copying said first selected feature motif;
   reducing the size of said copied motif;
   placing said reduced size motif on said feature path at a second selected location along said feature path; and
   orienting said reduced size motif with respect to a tangent to said feature path at said second selected location.

2. A method, as in claim 1, further comprising:
   orienting said reduced size motif in three dimensions.

3. A method, as in claim 1, wherein said reduced size motif is placed on said tangent at said record selected location.

4. A computer assisted method for creating a jewelry design, comprising:
   selecting a jewelry motif having a feature path and a plurality of locations along said feature path for placing feature motifs;
   selecting at least two feature motifs wherein each of said selected motifs has an assigned priority;
   placing a first priority feature motif on said feature path at a first selected location;
   orienting said first priority motif with respect to a tangent to said feature path at said first selected location;
   placing a second priority feature motif on said feature path at a second selected location;
   orienting said second priority feature motif with respect to a tangent to said feature path at said second selected location;
   copying said first priority feature motif;
   reducing the size of said first copied motif;
   placing said reduced size first priority feature motif on said feature path at a third selected location along said feature path;
   copying said second priority feature motif;
   reducing the size of said second copied motif; and
   placing said reduced size second motif on said feature path at a fourth selected location along said feature path.

5. A method, as in claim 4, further comprising:
   orienting said first and second reduced size motifs in three dimensions.

6. A method, as in claim 5, wherein said first and second reduced size motifs are placed on said tangent at said third and fourth selected locations respectively.

7. A system for creating a jewelry design, comprising:
   a central processing unit coupled to a memory, an input device and a display;
   said central processing unit receives a jewelry selection input from said input devices and retrieves from said memory a corresponding jewelry motif having a feature path and a plurality of locations along said feature path for placing feature motifs;
   said central processing unit receives at least two feature motif selections from said input device and retrieves from said memory two corresponding feature motifs each of which having an assigned priority;
   said central processing unit executes instructions retrieved from said memory to display said feature path on said display device;
   said central processing unit executes instructions retrieved from said memory to place on said display device a first priority feature motif on said feature path at a first selected location;
   said central processing unit executes instructions retrieved from said memory to orient on said display device said first priority motif with respect to a tangent to said feature path at said first selected location;
   said central processing unit executes instructions retrieved from said memory to place on said display device a second priority feature motif on said feature path at a second selected location;
   said central processing unit executes instructions retrieved from said memory to orient on said display device said second priority feature motif with respect to a tangent to said feature path at said second selected location;
   said central processing unit executes instructions retrieved from said memory to copy said first priority feature motif;
   said central processing unit executes instructions retrieved from said memory to reduce the size of said first copied motif;
   said central processing unit executes instructions retrieved from said memory to place on said display device said reduced size first priority feature motif on said feature path at a third selected location along said feature path;
   said central processing unit executes instructions retrieved from said memory to copy said second priority feature motif;
   said central processing unit executes instructions retrieved from said memory to reduce the size of said second copied motif; and
   said central processing unit executes instructions retrieved from said memory to place on said display device said reduced size second priority feature motif on said feature path at a fourth selected location along said feature path.

8. A method of creating a jewelry design, comprising:
   receiving information from a computer network;
   selecting a jewelry motif based on said information wherein said jewelry motif has a feature path and a plurality of locations along said feature path for placing feature motifs;
   selecting at least one feature motif based on said information wherein each of said selected feature motifs has an assigned priority;
   placing a first selected feature motif on said feature path at a first selected location;
   orienting said first selected feature motif with respect to a tangent to said feature path at said first selected location;
   copying said first selected feature motif;

reducing the size of said copied motif;

placing said reduced size motif on said feature path at a second selected location along said feature path; and orienting said reduced size motif with respect to a tangent to said feature path at said second selected location.

9. A method, as in claim 8, further comprising:

orienting said reduced size motif in three dimensions.

10. A method, as in claim 9, wherein said reduced size motif is placed on said tangent at said record selected location.

11. A method, as in claim 10, wherein said computer network comprises the worldwide web.

* * * * *